US011790677B2

(12) United States Patent
Balaji (10) Patent No.: US 11,790,677 B2
(45) Date of Patent: Oct. 17, 2023

(54) SYSTEM FOR DISTRIBUTED SERVER NETWORK WITH EMBEDDED IMAGE DECODER AS CHAIN CODE PROGRAM RUNTIME

(71) Applicant: BANK OF AMERICA CORPORATION, Charlotte, NC (US)

(72) Inventor: Sujatha Balaji, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 540 days.

(21) Appl. No.: 17/060,106

(22) Filed: Oct. 1, 2020

(65) Prior Publication Data
US 2022/0108102 A1 Apr. 7, 2022

(51) Int. Cl.
G06V 30/148 (2022.01)
G06F 16/13 (2019.01)
G06F 16/51 (2019.01)
G06V 40/16 (2022.01)
G06V 30/12 (2022.01)

(52) U.S. Cl.
CPC ........... *G06V 30/158* (2022.01); *G06F 16/13* (2019.01); *G06F 16/51* (2019.01); *G06V 30/133* (2022.01); *G06V 40/172* (2022.01)

(58) Field of Classification Search
CPC .................................................. G06V 40/172
See application file for complete search history.

(56) References Cited

U.S. PATENT DOCUMENTS

| | | | |
|---|---|---|---|
| 7,822,856 B2 | 10/2010 | Zuckerman et al. | |
| 8,321,900 B2 | 11/2012 | Ramaswami et al. | |
| 8,626,820 B1 | 1/2014 | Levy | |
| 8,776,161 B2 | 7/2014 | Gazier et al. | |
| 8,984,371 B2 | 3/2015 | Gladwin et al. | |
| 9,061,207 B2 | 6/2015 | Perlman et al. | |
| 9,104,719 B2 | 8/2015 | Leggette | |
| 9,225,760 B2 | 12/2015 | Ralston et al. | |
| 9,811,405 B2 | 11/2017 | Motwani et al. | |
| 10,032,042 B1* | 7/2018 | Eckel | G06Q 30/018 |
| 10,315,109 B2 | 6/2019 | Perry et al. | |
| 10,382,797 B2 | 8/2019 | Sze et al. | |
| 10,616,294 B2 | 4/2020 | Shribman et al. | |
| 10,652,629 B2 | 5/2020 | Perry | |
| 2005/0049977 A1* | 3/2005 | Suisa | H04L 9/3249 705/71 |
| 2005/0289182 A1* | 12/2005 | Pandian | G06Q 10/10 |
| 2008/0007651 A1 | 1/2008 | Bennett | |

(Continued)

*Primary Examiner* — Edward Park
(74) *Attorney, Agent, or Firm* — Moore & Van Allen PLLC; Seongun M. Hong (57) ABSTRACT

A system is provided for a distributed server network with embedded image decoder as a chain code program runtime event. In particular, the system may comprise a distributed computing network comprising one or more decentralized nodes, each of which may store a separate copy of a distributed data register. The system may further comprise one or more specialized nodes which receive, assess, and analyze user input data, where the one or more specialized nodes may include a client identity node comprising an embedded image decoder which may be configured to analyze image portions of the user input data. Once the image data has been analyzed, the client identity node may convert the image data into a text format for storage within the distributed register.

20 Claims, 3 Drawing Sheets

(56) References Cited

U.S. PATENT DOCUMENTS

| | | |
|---|---|---|
| 2014/0268247 A1* | 9/2014 | Sakaida ............ H04N 1/00068 |
| | | 358/450 |
| 2014/0283120 A1 | 9/2014 | Mao et al. |
| 2014/0368688 A1* | 12/2014 | John Archibald .... G06F 1/3215 |
| | | 348/222.1 |
| 2016/0080457 A1 | 3/2016 | Perry et al. |
| 2016/0210444 A1 | 7/2016 | Epstein et al. |
| 2017/0329996 A1 | 11/2017 | Wilson |
| 2018/0288369 A1 | 10/2018 | Gaebel, Jr. et al. |
| 2018/0310058 A1 | 10/2018 | Gordon |
| 2019/0171616 A1 | 6/2019 | Resch et al. |

* cited by examiner

SYSTEM FOR DISTRIBUTED SERVER NETWORK WITH EMBEDDED IMAGE DECODER AS CHAIN CODE PROGRAM RUNTIME

FIELD OF THE INVENTION

The present disclosure embraces a system for a distributed server network with embedded image decoder as chain code program runtime.

BACKGROUND

There is a need for an efficient and secure way to perform data scanning and analysis.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for a distributed server network with embedded image decoder as a chain code program runtime event. In particular, the system may comprise a distributed computing network comprising one or more decentralized nodes, each of which may store a separate copy of a distributed data register. The system may further comprise one or more specialized nodes which receive, assess, and analyze user input data, where the one or more specialized nodes may include a client identity node comprising an embedded image decoder which may be configured to analyze image portions of the user input data. Once the image data has been analyzed, the client identity node may convert the image data into a text format for storage within the distributed register. In this way, the system provides a secure and transparent way of performing input data analysis and efficiently storing user input data within a distributed register by reducing file storage requirements.

Accordingly, embodiments of the present disclosure provide a system for a distributed server network with embedded image decoder as chain code. The system may comprise a memory device with computer-readable program code stored thereon; a communication device; and a processing device operatively coupled to the memory device and the communication device. The processing device may configured to execute the computer-readable program code to receive user data from a user, wherein the user data comprises image data associated with an identity of the user; process, through a client identity node running the embedded image decoder, the image data associated with the identity of the user; generate text data associated with the identity of the user from the image data associated with the identity of the user; generate a pending data record comprising the text data associated with the identity of the user; and validate the pending data record to be appended to a distributed data register.

In some embodiments, the embedded image decoder comprises an optical character recognition ("OCR") component, wherein generating the text data comprises identifying character information from one or more fields within the image data.

In some embodiments, processing the image data comprises detecting, through a machine learning mechanism, a document type associated with the image data; accessing an OCR library comprising one or more document templates; retrieving, from the OCR library, a document template associated with the document type, wherein the document template indicates a location of the one or more fields within the image data; and scanning the one or more fields within the image data using the OCR component.

In some embodiments, validating the pending data record comprises performing one or more validation checks on the pending data record; and based on performing the one or more validation checks, permanently appending the pending data record to the distributed data register.

In some embodiments, the one or more validation checks comprises verifying that the one or more fields contain a correct number and type of characters.

In some embodiments, the computer-readable program code further causes the processing device to detect that an image quality associated with the image data is below a defined threshold; and prompt the user to upload a second set of image data.

In some embodiments, detecting that the image quality associated with the image data is below the defined threshold comprises detecting one or more conditions, wherein the one or more conditions comprises at least one of low resolution, scanning errors, and compression artifacts.

Embodiments of the present disclosure also provide a computer program product for a distributed server network with embedded image decoder as chain code. The computer program product may comprise at least one non-transitory computer readable medium having computer-readable program code portions embodied therein, the computer-readable program code portions comprising executable portions for receiving user data from a user, wherein the user data comprises image data associated with an identity of the user; processing, through a client identity node running the embedded image decoder, the image data associated with the identity of the user; generating text data associated with the identity of the user from the image data associated with the identity of the user; generating a pending data record comprising the text data associated with the identity of the user; and validating the pending data record to be appended to a distributed data register.

In some embodiments, the embedded image decoder comprises an optical character recognition ("OCR") component, wherein generating the text data comprises identifying character information from one or more fields within the image data.

In some embodiments, processing the image data comprises detecting, through a machine learning mechanism, a document type associated with the image data; accessing an OCR library comprising one or more document templates; retrieving, from the OCR library, a document template associated with the document type, wherein the document template indicates a location of the one or more fields within the image data; and scanning the one or more fields within the image data using the OCR component.

In some embodiments, validating the pending data record comprises performing one or more validation checks on the pending data record; and based on performing the one or more validation checks, permanently appending the pending data record to the distributed data register.

In some embodiments, the one or more validation checks comprises verifying that the one or more fields contain a correct number and type of characters.

In some embodiments, the computer-readable program code portions further comprise executable portions for detecting that an image quality associated with the image data is below a defined threshold; and prompting the user to upload a second set of image data.

Embodiments of the present disclosure also provide a computer-implemented method for a distributed server network with embedded image decoder as chain code, the method comprising receiving user data from a user, wherein the user data comprises image data associated with an identity of the user; processing, through a client identity node running the embedded image decoder, the image data associated with the identity of the user; generating text data associated with the identity of the user from the image data associated with the identity of the user; generating a pending data record comprising the text data associated with the identity of the user; and validating the pending data record to be appended to a distributed data register.

In some embodiments, the embedded image decoder comprises an optical character recognition ("OCR") component, wherein generating the text data comprises identifying character information from one or more fields within the image data.

In some embodiments, processing the image data comprises detecting, through a machine learning mechanism, a document type associated with the image data; accessing an OCR library comprising one or more document templates; retrieving, from the OCR library, a document template associated with the document type, wherein the document template indicates a location of the one or more fields within the image data; and scanning the one or more fields within the image data using the OCR component.

In some embodiments, validating the pending data record comprises performing one or more validation checks on the pending data record; and based on performing the one or more validation checks, permanently appending the pending data record to the distributed data register.

In some embodiments, the one or more validation checks comprises verifying that the one or more fields contain a correct number and type of characters.

In some embodiments, the computer-implemented method further comprises detecting that an image quality associated with the image data is below a defined threshold; and prompting the user to upload a second set of image data.

In some embodiments, detecting that the image quality associated with the image data is below the defined threshold comprises detecting one or more conditions, wherein the one or more conditions comprises at least one of low resolution, scanning errors, and compression artifacts.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block structure. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed ledger" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed ledger" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

"Chain code" as used herein may refer to code that may be deployed to a distributed register to run operational logic based on the information within the distributed register. Accordingly, in some embodiments, a smart contract may be implemented as chain code stored within the distributed register.

In providing web-based services to one or more users, an entity may receive certain types of data from the users (e.g., user data) to drive the entity's processes. For instance, the user data collected may include image files (e.g., scanned documents containing information about the user). Upon receiving such files from the user, it may be desirable for the entity to automatically analyze the image files to extract relevant information (e.g., an identity of the user) in an efficient way. In this regard, the system may store user data within a distributed register which may be stored across one or more nodes. The one or more nodes may comprise a client identity node to which users may upload image files for analysis and subsequent processing. In this regard, the client identity node may comprise an embedded image decoder running as chain code or a smart contract within the client identity node.

The image decoder may comprise an optical character recognition ("OCR") component that may convert the pixels within the image to a text-based format. In this regard, the OCR component may comprise an OCR library which may comprise various templates for different types of image documents (e.g., passports, identification cards, driver's licenses, and the like). Each template may comprise one or more zones that may mark a particular location within the document from which user data may be extracted. The templates may further comprise application-specific information on what types of information may be found within a particular zone (e.g., a machine readable zone or "MRZ"

within a password may include a character string that may include numerals, letters, or a filler character). In some embodiments, the image decoder may extract information relating to an identity of the user. In such embodiments, examples of information extracted may include a name, address, citizenship, geographic location, or other types of information relating to the identity of the user.

Once the text data associated with the user has been generated, the system may submit the text data to the other nodes to be appended to the distributed register. The text data may be streamed to a natural language processing ("NLP") node within the artificial intelligence ("AI") and/or machine learning layer, where the NLP node may, using NLP, analyze the text data to identify one or more impact parameters. The impact parameters may indicate the degree of potential impact that a particular action may have on the system and/or the entity. The NLP node may further comprise a decisioning engine which may calculate an impact score associated with the user by running predictive impact models based on the impact parameters identified by the NLP node. In some embodiments, higher impact scores may reflect a higher degree of potential impact, whereas lower impact scores may reflect a lower degree of potential impact. The impact scores generated by the decisioning engine may be stored in an impact database which may serve as a historical record of outputs produced by the decisioning engine.

The NLP node may then convert the output produced by the decisioning engine into a readable format using natural language generation ("NLG") to produce an NLG output. The NLG output may comprise an explanation of the impact score and/or the factors or processes which were used to calculate the impact score. In this way, the system may provide a secure and transparent way to conduct its impact analysis processes.

An exemplary use case is provided as follows for illustrative purposes. In one embodiment, an entity such as a financial institution may use the system may process user data as part of a customer onboarding process. In this regard, the user may upload image files of documents relating to the user's identity (e.g., "know your customer" or "KYC" documents) to the client identity node within the entity's distributed server network. For instance, the user may upload a scanned image of the user's passport for identification purposes. Once uploaded, the client identity node may use the OCR library to detect the readable zones within the image of the user's passport. The client identity node may then use OCR to convert the image within the readable zones into text data associated with the user. In some embodiments, the client identity node may further be configured to detect a noise level of the uploaded image, where the noise level may indicate the degree to which reliable detection of characters within the readable zones may be hindered by factors such as compression artifacts, scanning errors, low resolution and/or pixel density, or the like. If the noise level reaches a predetermined threshold, the client identity node may display a notification to the user to upload a new image with improved image quality (e.g., a higher resolution image, an image created using lossless compression, or the like).

Upon generating the text data, the client identity node may publish a pending data record comprising the text data to be appended to the distributed register across all of the nodes within the entity's distributed server network. Once the pending data record is validated by the nodes, the text data associated with the user's identity may be stored within an encrypted data record within the distributed register.

The text data may then be pushed to the NLP node for further processing. Accordingly, the system may use NLP to analyze the text within the user data and extract information that may be relevant to the decisioning processes regarding user onboarding. For example, the system may extract information associated with the user, such as name, status, location, and the like.

Based on the extracted information, the decisioning engine may assess the potential impact of onboarding the user. For instance, the system may determine that the location of the user is associated with a higher potential impact to the system and/or the entity. Accordingly, the system may generate an impact score which may reflect the higher potential impacts of onboarding the user. Once the impact score is generated, the system may use NLG to generate a readable output which may contain an explanation of the output of the decisioning engine (e.g., calculation of the impact score, and the like).

The system as described herein confers a number of technological advantages over conventional data analysis systems. For example, extracting relevant data from images obtained from the user and converting the data to a text-based format allows the system to avoid storing computing resource-intensive image files within the distributed register, thereby multiplicatively increasing the computing efficiency of the data storage and validation processes across all nodes within the distributed server network. Furthermore, storing user data within the distributed ledger ensures the integrity and security of the data used to drive the decisioning processes.

Figure 1:
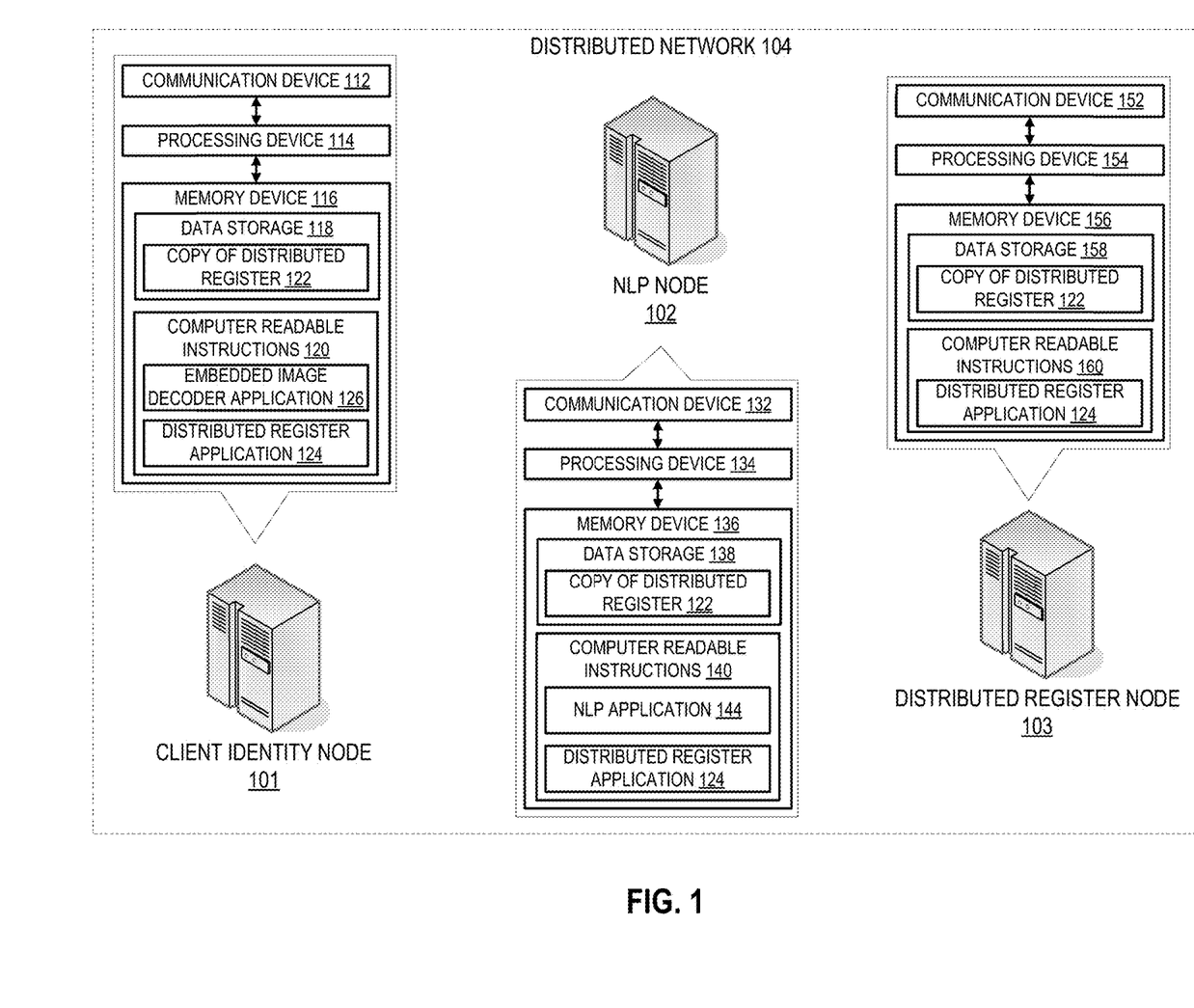
FIG. 1 illustrates an operating environment for the embedded image decoder system, in accordance with one embodiment of the present disclosure.

Turning now to the figures, FIG. 1 illustrates an operating environment 100 for the embedded image decoder system, in accordance with one embodiment of the present disclosure. In particular, FIG. 1 illustrates a client identity node 101, a NLP node 102, and a distributed register node 103 within a distributed network 104, where each of the nodes 101, 102, 103 host a copy of a distributed register 122, as will be described in further detail below. The nodes 101, 102, 103 within the distributed network 104 may be communicatively coupled with one another such that the nodes may send data to and receive data from the other nodes within the distributed network 104. It should be understood that FIG. 1 illustrates only an exemplary embodiment of the operating environment 100, and it will be appreciated that one or more functions of the systems, devices, or servers as depicted in FIG. 1 may be combined into a single system, device, or server and/or performed by other computing systems. For instance, though the client identity node 101 and the NLP node 102 are depicted as separate systems, in some embodiments, the functions of each of the said nodes may be performed on a single system. Furthermore, a single system, device, or server as depicted in FIG. 1 may represent multiple systems, devices, or servers. For instance, though FIG. 1 depicts three nodes 101, 102, 103, the operating environment may comprise a fewer or greater number of nodes of varying types according to the implementation of the system described herein.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the client identity node 101 may be a part of the distributed network 104, where the client identity node 101 may perform the image analysis functions as described herein. In this regard, the client identity node 101 may be, for example, a networked terminal, server, desktop computer, or the like, though it is within the scope of the disclosure for the client identity node 101 to be a portable device such as a cellular phone, smart phone, smart device, personal data assistant (PDA), laptop, or the like. The client identity node 101 may comprise a communication device 112, a processing device 114, and a memory device 116, where the processing device 114 is operatively coupled to the communication device 112 and the memory device 116. The processing device 114 uses the communication device 112 to communicate with the network and other devices on the network. As such, the communication device 112 generally comprises a modem, antennae, WiFi or Ethernet adapter, radio transceiver, or other device for communicating with other devices on the network.

The memory device 116 comprises computer-readable instructions 120 and data storage 118, where the data storage 118 may comprise a copy of the distributed register 122. The distributed register (and the copy of the distributed register 122) may comprise a series of data records relevant to the objectives of an entity associated with the distributed network 104. For instance, the distributed register may comprise a series of data records which may contain data and/or metadata associated with one or more users (e.g., image data), where the users may be clients of the entity. In this regard, the computer-readable instructions 120 may have a distributed register application 124 stored thereon, where the distributed register application 124 may allow the client identity node 101 to read data from the distributed register, submit data records to the distributed register, contribute to the consensus mechanism, or the like. The computer-readable instructions 120 may further comprise an embedded image decoder application 126 which may cause the client identity node 101 to perform the image scanning and analysis processes as described herein. In this regard, the embedded image decoder application 126 may comprise an OCR component which may be configured to read pixel information within image files to generate text data. In some embodiments, the data storage 118 of the client identity node 101 may further comprise an OCR library or database which may comprise one or more templates for image documents that may be received by the client identity node 101 from the user.

As further illustrated in FIG. 1, the NLP node 102 may also be a part of the distributed network 104 and comprise a communication device 132, a processing device 134, and a memory device 136. The NLP node 102 may be a node that is part of an AI/machine learning layer of the entity system. Accordingly, the NLP node 102 may perform the NLP processing, decisioning, and NLG functions as described herein based on the information stored within the distributed register.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 132, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

The processing device 134 is operatively coupled to the communication device 132 and the memory device 136. The processing device 134 uses the communication device 132 to communicate with the network and other devices on the network, such as, but not limited to the client identity node 101 and/or the distributed register node 103. The communication device 132 generally comprises a modem, antennae, WiFi or Ethernet adapter, radio transceiver, or other device for communicating with other devices on the network.

In some embodiments, the memory device 136 may further include data storage 138 which may comprise a copy of the distributed register 12. The memory device 136 may have computer-readable instructions 140 stored thereon, which may further comprise the distributed register application 124. The memory device 136 may further comprise an NLP application 144 which may cause the processing device 134 to perform the NLP and NLG processes as described elsewhere herein.

As further illustrated in FIG. 1, the distributed register node 103 may be a part of the distributed network 104 and comprise a processing device 154 operatively coupled to a communication device 152 and a memory device 156. The memory device 156 may comprise data storage 158 having a copy of the distributed register 122 stored thereon. The memory device 156 may further comprise computer-readable instructions 160 of the distributed register application 124. In some embodiments, the distributed register node 103 may be a general purpose node which hosts a copy of the distributed register 122. In other embodiments, in addition to or instead of being a general purpose node, the distributed register node 103 may be a specialized node which may serve certain specialized functions with respect to the distributed register. For example, the distributed register node 103 may be a node which may be configured to distribute scripts of organizational rules to the remaining nodes (e.g., a "screening node"). In other embodiments, the distributed register node 103 may be configured to receive data from users to be incorporated into the distributed register (e.g., a "client node" or "customer node") and/or from other entities (e.g., an "agency node").

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

Figure 2:
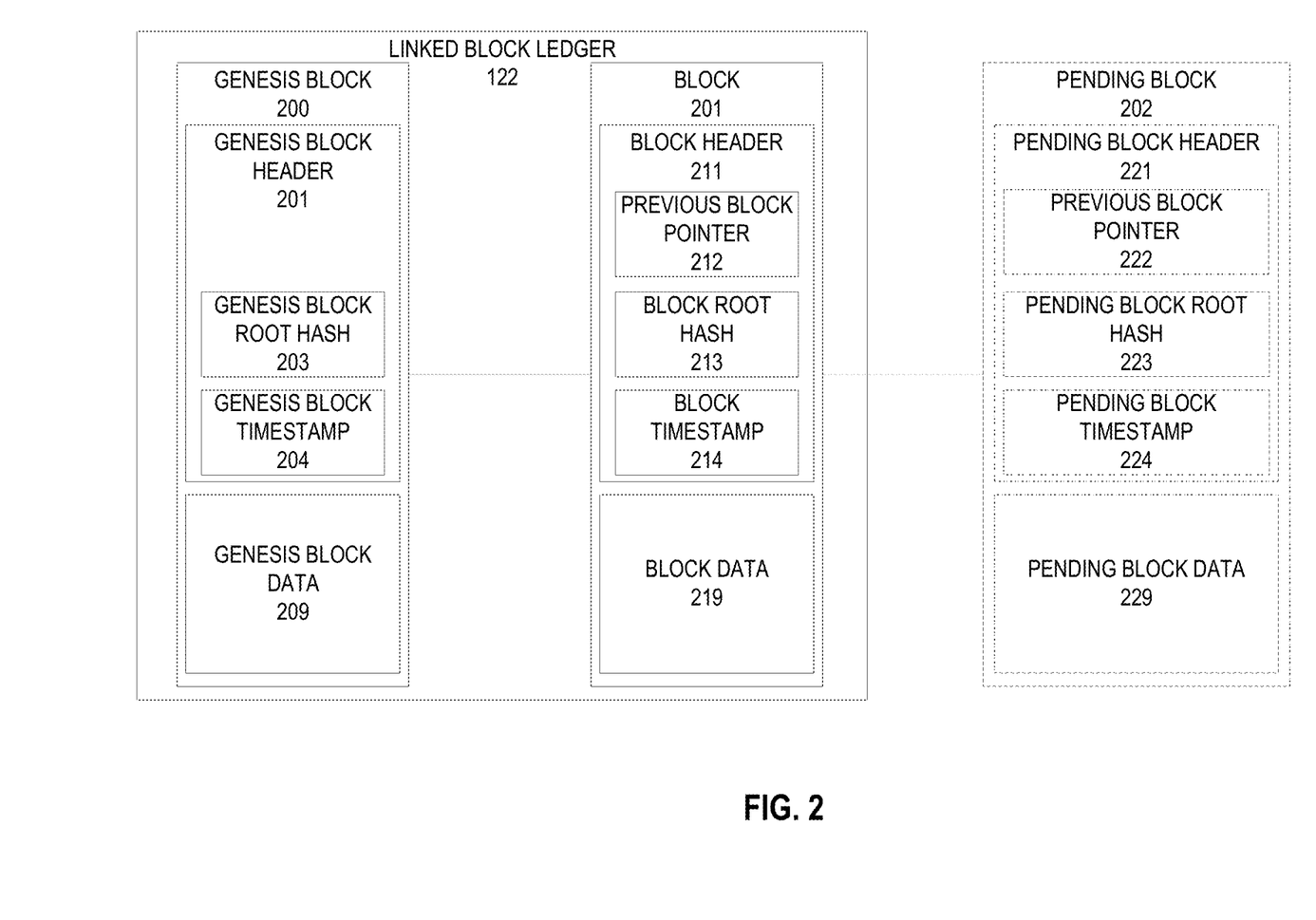
FIG. 2 is a block diagram illustrating the data structures within an exemplary distributed register, in accordance with one embodiment of the present disclosure.

FIG. 2 is a block diagram illustrating the data structures within an exemplary linked block ledger, in accordance with some embodiments. In particular, FIG. 2 depicts a plurality of blocks 200, 201 within the linked block ledger 122 (which in some embodiments may exist as a copy of a distributed register 122 on one or more nodes), in addition to a pending block 202 that has been submitted to be appended to the linked block ledger 122. The linked block ledger 122 may comprise a genesis block 200 that serves as the first block and origin for subsequent blocks in the linked block ledger 122. The genesis block 200, like all other blocks within the linked block ledger 122, comprise a block header 201 and block data 209. The genesis block data 209, or any other instances of block data within the linked block ledger 122 (or any other distributed register) may contain one or more data records. For instance, block data may comprise software source code, authentication data, transaction data, documents or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the linked block ledger 122. In some embodiments, the timestamp may be a Unix timestamp. In some embodiments, particularly in ledgers utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the linked block structure. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (e.g., the genesis block 200) in the linked block ledger 122, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the ledger to pass the validation checks imposed by the consensus algorithm. Thus, the computational impracticability of altering data records in a ledger in turn greatly reduces the probability of improper alteration of data records.

A pending block 202 or "proposed block" may be submitted for addition to the linked block ledger 122. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the linked block structure, produces a hash value that falls under a specified threshold value. For instance, the PoW algorithm may require that said hash value begins with a certain number of zeroes. Once said nonce value is determined by one of the nodes, the node may post the "solution" to the other nodes. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the linked block ledger 122. A pending block timestamp 224 may also be added to signify the time at which the pending block 202 is added to the linked block ledger 122.

In other embodiments, the consensus mechanism may be based on a total number of consensus inputs submitted by the nodes of the linked block ledger 122, e.g., a PBFT consensus mechanism. Once a threshold number of consensus inputs to validate the pending block 202 has been reached, the pending block 202 may be appended to the linked block ledger 122. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

Figure 3:
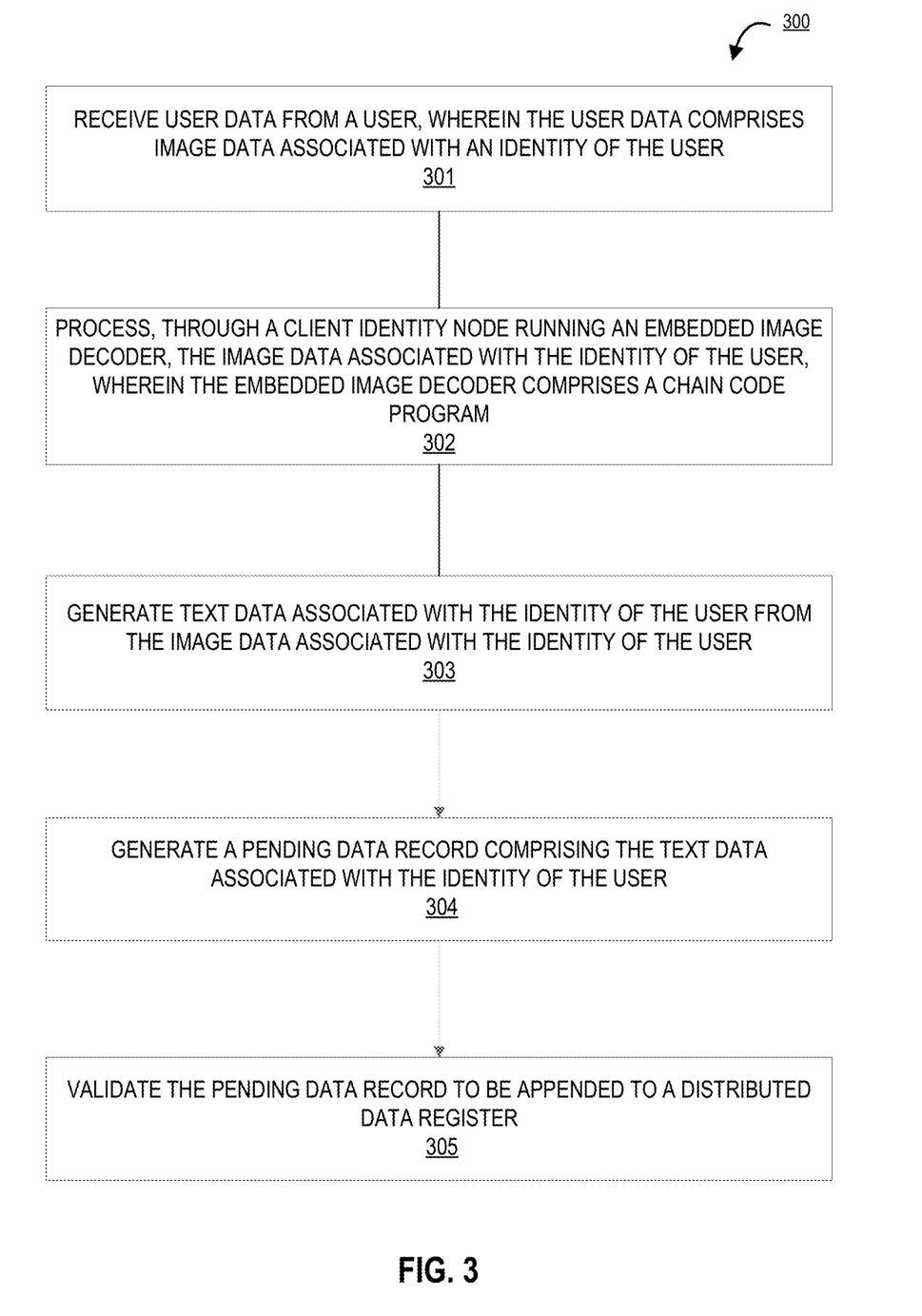
FIG. 3 is a flow diagram illustrating a process for extracting user data with an embedded image decoder as a chain code runtime event, in accordance with one embodiment of the present disclosure.

FIG. 3 is a flow diagram illustrating a process for extracting user data with an embedded image decoder as a chain code runtime event, in accordance with one embodiment of the present disclosure. The process begins at block 301, where the system receives user data from a user, wherein the user data comprises image data associated with an identity of the user. For instance, the image data may comprise a digital image file containing a scanned or captured image of an identifying document such as a passport, government identification card, driver's license, or the like. In an exemplary embodiment, an entity may request that the user (e.g., a customer or potential customer of the entity) upload an identifying document to the entity's network so that the entity may verify the identity of the user.

The process continues to block 302, where the system processes, through a client identity node running an embedded image decoder, the image data associated with the identity of the user, wherein the embedded image decoder comprises a chain code program. The embedded image decoder may, in some embodiments, be embedded within the distributed register hosted at least in part by the client identity node (e.g., as a smart contract). Accordingly, the embedded image decoder may comprise an OCR mechanism through which the embedded image decoder reads and extracts information from the pixels in certain areas or fields within the image data.

In some embodiments, the embedded image decoder may access a customized OCR library stored on the client identity node, where the OCR library contains templates that indicate the location of the various fields from which identifying information may be extracted. In this regard, the system may further be configured to identify a document type associated with the image data. For instance, the user may indicate (e.g., through a graphical interface) that the uploaded file contains a scanned image of the user's passport. In other embodiments, the system may use a machine learning component to automatically identify the document as a passport. Upon identifying the document type, the system may access the OCR library to retrieve a template associated with the document type. Based on the template, the system may identify one or more fields to process using the OCR component of the embedded image decoder. Upon identifying the one or more fields, the system may proceed to convert the pixels within the fields to text data.

In an exemplary embodiment, the user may upload a scanned image of the user's driver's license. The system may identify the image file as containing a driver's license (e.g., using machine learning) and retrieve the corresponding template from the OCR library. Based on the fields identified in the driver's license template (e.g., locations within the document corresponding to the license holder's name, ID number, address, and the like), the system may convert the pixel information within such fields into text data. In some embodiments, the template may further comprise information about what types of characters may appear in certain fields. For example, a field corresponding to an ID number may contain only numerical characters.

In some embodiments, the system may be configured to detect whether the image uploaded by the user is of adequate quality to perform the OCR processes described above. In this regard, the system may begin by detecting a quality level of the image data uploaded by the user. If the quality level drops below a designated threshold (e.g., the image contains compression artifacts, is of inadequate resolution, has scanning errors, or the like), the system may automatically prompt the user to upload a second image file of higher quality.

The process continues to block 303, where the system generates text data associated with the identity of the user from the image data associated with the identity of the user. Based on the information identified within the image data (e.g., via OCR), the system may generate text data from the various fields identified within the image data. Continuing the above example, if the user's ID number is identified by OCR to be 01234567, the system may generate text data having a field value that matches the user's ID number. In some embodiments, for each field value converted to text, the system may associate a field identifier which may be a descriptor that identifies the type of data that each value represents. For instance, the system may associate a field identifier of "ID Number" to the value of 01234567.

The process continues to block 304, where the system generates a pending data record comprising the text data associated with the identity of the user. In this regard, the pending data record containing the text data may be pushed to the various nodes within the distributed server network, where the pending data record is being proposed for addition to the distributed register hosted on the various nodes. At this stage, the nodes may execute a validation process by which the data within the pending data record is validated by at least a portion of the one or more nodes (e.g., via a consensus algorithm). The validation process may include performing a series of validation checks (e.g., the field value matches the field identifier, the document type is an acceptable form of identification, the field values contain the correct number and/or type of characters, the field values are consistent with previously collected information, and the like). For instance, if the nodes detect that the pending data record contains a field value for an ID number that matches a previously stored ID number within the distributed register but the field value for the user's name does not match the previously stored name, the nodes may invalidate the pending data record and reject the addition of the pending data record to the distributed register.

The process continues to block 305, where the system validates the pending data record to be appended to a distributed data register. At this stage, the nodes within the distributed server network have performed the validation checks necessary to validate the pending data record. Once the pending data record has been validated, the pending data record may be permanently appended to the distributed data register. In this way, the system may provide a space-efficient way to extract relevant identifying information from user-provided image files and storing such information in a resilient ledger that is distributed across multiple computing systems.

In some embodiments, the system may be configured to analyze the text data generated by the client identity node.

In this regard, the system analyze the text data using a machine learning component which may use NLP to interpret the identifying information provided by the user. In particular, the system may predict the amount of potential outcomes involved in onboarding a particular customer. In such scenarios, the system may identify one or more impact parameters associated with the user based on the text data. For instance, the system may check for consistency and/or authenticity of the information provided by the user, verify that the user is not a known malicious user, and the like.

In some embodiments, the machine learning component may generate an impact score associated with the user, where the impact score may be a numerical value which represents the degree of impact associated with onboarding a particular user. Higher impact scores may represent a greater potential impact, whereas lower impact scores may represent a comparatively lesser potential impact. Accordingly, the system may decide whether or not to execute certain processes based on the impact score meeting a certain threshold. For example, the system may automatically prevent the user data from further processing if the impact score is above a defined threshold.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for a distributed server network with embedded image decoder as chain code, the system comprising:
   a memory device with computer-readable program code stored thereon;
   a communication device; and
   a processing device operatively coupled to the memory device and the communication device, wherein the processing device is configured to execute the computer-readable program code to:

initiate a user onboarding process;

receive user data from a user, wherein the user data comprises image data associated with an identity of the user;

process, through a client identity node running the embedded image decoder, the image data associated with the identity of the user;

generate text data associated with the identity of the user from the image data associated with the identity of the user;

generate a pending data record comprising the text data associated with the identity of the user;

validate the pending data record to be appended to a distributed data register;

based on the text data associated with the identity of the user, extract identifying information of the user, the identifying information comprising at least one of a name, address, status, or geographic location of the user;

identify, using a natural language processing ("NLP") node, one or more impact parameters associated with the identifying information;

based on the impact parameters, calculate an impact score associated with the user, wherein the impact score indicates a potential impact of onboarding the user; and using a natural language generation ("NLG") algorithm, generate an output comprising the impact score and an explanation of the calculation of the impact score.

2. The system according to claim 1, wherein the embedded image decoder comprises an optical character recognition ("OCR") component, wherein generating the text data comprises identifying character information from one or more fields within the image data.

3. The system according to claim 2, wherein processing the image data comprises:

detecting, through a machine learning mechanism, a document type associated with the image data;

accessing an OCR library comprising one or more document templates;

retrieving, from the OCR library, a document template associated with the document type, wherein the document template indicates a location of the one or more fields within the image data; and scanning the one or more fields within the image data using the OCR component.

4. The system according to claim 1, wherein validating the pending data record comprises:

performing one or more validation checks on the pending data record; and based on performing the one or more validation checks, permanently appending the pending data record to the distributed data register.

5. The system according to claim 4, wherein the one or more validation checks comprises verifying that one or more fields contain a correct number and type of characters.

6. The system according to claim 1, wherein the computer-readable program code further causes the processing device to:

detect that an image quality associated with the image data is below a defined threshold; and prompt the user to upload a second set of image data.

7. The system according to claim 6, wherein detecting that the image quality associated with the image data is below the defined threshold comprises detecting one or more conditions, wherein the one or more conditions comprises at least one of low resolution, scanning errors, and compression artifacts.

8. A computer program product for a distributed server network with embedded image decoder as chain code, the computer program product comprising at least one non-transitory computer readable medium having computer-readable program code portions embodied therein, the computer-readable program code portions comprising executable portions for:

initiating a user onboarding process;

receiving user data from a user, wherein the user data comprises image data associated with an identity of the user;

processing, through a client identity node running the embedded image decoder, the image data associated with the identity of the user;

generating text data associated with the identity of the user from the image data associated with the identity of the user;

generating a pending data record comprising the text data associated with the identity of the user;

validating the pending data record to be appended to a distributed data register;

based on the text data associated with the identity of the user, extracting identifying information of the user, the identifying information comprising at least one of a name, address, status, or geographic location of the user;

identifying, using a natural language processing ("NLP") node, one or more impact parameters associated with the identifying information;

based on the impact parameters, calculating an impact score associated with the user, wherein the impact score indicates a potential impact of onboarding the user; and using a natural language generation ("NLG") algorithm, generating an output comprising the impact score and an explanation of the calculation of the impact score.

9. The computer program product of claim 8, wherein the embedded image decoder comprises an optical character recognition ("OCR") component, wherein generating the text data comprises identifying character information from one or more fields within the image data.

10. The computer program product of claim 9, wherein processing the image data comprises:

detecting, through a machine learning mechanism, a document type associated with the image data;

accessing an OCR library comprising one or more document templates;

retrieving, from the OCR library, a document template associated with the document type, wherein the document template indicates a location of the one or more fields within the image data; and scanning the one or more fields within the image data using the OCR component.

11. The computer program product of claim 8, wherein validating the pending data record comprises:

performing one or more validation checks on the pending data record; and based on performing the one or more validation checks, permanently appending the pending data record to the distributed data register.

12. The computer program product of claim 11, wherein the one or more validation checks comprises verifying that one or more fields contain a correct number and type of characters.

13. The computer program product of claim 8, wherein the computer-readable program code portions further comprise executable portions for:
  detecting that an image quality associated with the image data is below a defined threshold; and
  prompting the user to upload a second set of image data.

14. A computer-implemented method for a distributed server network with embedded image decoder as chain code, the method comprising:
  initiating a user onboarding process;
  receiving user data from a user, wherein the user data comprises image data associated with an identity of the user;
  processing, through a client identity node running the embedded image decoder, the image data associated with the identity of the user;
  generating text data associated with the identity of the user from the image data associated with the identity of the user;
  generating a pending data record comprising the text data associated with the identity of the user;
  validating the pending data record to be appended to a distributed data register;
  based on the text data associated with the identity of the user, extracting identifying information of the user, the identifying information comprising at least one of a name, address, status, or geographic location of the user;
  identifying, using a natural language processing ("NLP") node, one or more impact parameters associated with the identifying information;
  based on the impact parameters, calculating an impact score associated with the user, wherein the impact score indicates a potential impact of onboarding the user; and
  using a natural language generation ("NLG") algorithm, generating an output comprising the impact score and an explanation of the calculation of the impact score.

15. The computer-implemented method of claim 14, wherein the embedded image decoder comprises an optical character recognition ("OCR") component, wherein generating the text data comprises identifying character information from one or more fields within the image data.

16. The computer-implemented method of claim 15, wherein processing the image data comprises:
  detecting, through a machine learning mechanism, a document type associated with the image data;
  accessing an OCR library comprising one or more document templates;
  retrieving, from the OCR library, a document template associated with the document type, wherein the document template indicates a location of the one or more fields within the image data; and
  scanning the one or more fields within the image data using the OCR component.

17. The computer-implemented method of claim 14, wherein validating the pending data record comprises:
  performing one or more validation checks on the pending data record; and
  based on performing the one or more validation checks, permanently appending the pending data record to the distributed data register.

18. The computer-implemented method of claim 17, wherein the one or more validation checks comprises verifying that one or more fields contain a correct number and type of characters.

19. The computer-implemented method of claim 14, wherein the computer-implemented method further comprises:
  detecting that an image quality associated with the image data is below a defined threshold; and
  prompting the user to upload a second set of image data.

20. The computer-implemented method of claim 19, wherein detecting that the image quality associated with the image data is below the defined threshold comprises detecting one or more conditions, wherein the one or more conditions comprises at least one of low resolution, scanning errors, and compression artifacts.

\* \* \* \* \*